(12) United States Patent
Vermeulen (10) Patent No.: US 12,203,277 B2
(45) Date of Patent: Jan. 21, 2025

(54) FLOOR PANEL

(71) Applicant: FLOORING INDUSTRIES LIMITED, SARL, Bertrange (LU)

(72) Inventor: Bruno Vermeulen, Aldeneik-Maaseik (BE)

(73) Assignee: UNILIN BV, Wielsbeke (BE)

( * ) Notice: Subject to any disclaimer, the term of this patent is extended or adjusted under 35 U.S.C. 154(b) by 280 days.

(21) Appl. No.: 17/628,468

(22) PCT Filed: Jul. 17, 2020

(86) PCT No.: PCT/IB2020/056740
§ 371 (c)(1),
(2) Date: Jan. 19, 2022

(87) PCT Pub. No.: WO2021/014307
PCT Pub. Date: Jan. 28, 2021

(65) Prior Publication Data
US 2022/0251854 A1    Aug. 11, 2022

(30) Foreign Application Priority Data

Jul. 22, 2019 (BE) .................................. 2019/5476

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 3/30* (2013.01); *B32B 5/02* (2013.01);
(Continued)

(58) Field of Classification Search
CPC ............ E04F 15/107; B32B 3/06; B32B 3/30; B32B 5/02; B32B 5/18; B32B 13/02;
(Continued)

(56) References Cited

U.S. PATENT DOCUMENTS 7,311,869 B2    12/2007  Espe et al.
2004/0170812 A1  9/2004  Sjoberg
(Continued)

FOREIGN PATENT DOCUMENTS

CN     1516646 A    7/2004
CN   101084125 A   12/2007
(Continued)

OTHER PUBLICATIONS

Search Report and Written Opinion from corresponding Belgian Application No. BE2019/5476, Apr. 15, 2020.
(Continued)

*Primary Examiner* — Catherine A. Simone
(74) *Attorney, Agent, or Firm* — Workman Nydegger (57) ABSTRACT

A floor panel includes several side edges extending in the peripheral direction of the floor panel behind one another and separated from one another by a corner, and a plastic top surface delimited by the side edges. A portion of the top surface is provided with at least two elongate zones with a mutually different texture which also deviates from the texture of an area of the top surface which adjoins the zones. The zones form edge zones, each of which extends along one of the side edges or the long sides of the zones adjoin each other.

20 Claims, 11 Drawing Sheets

(51) Int. Cl.
*B32B 3/30* (2006.01)
*B32B 5/02* (2006.01)
*B32B 5/18* (2006.01)
*B32B 13/02* (2006.01)
*B32B 13/12* (2006.01)
*B32B 21/02* (2006.01)
*B32B 27/06* (2006.01)
*B32B 27/12* (2006.01)
*B32B 27/30* (2006.01)
*B32B 27/32* (2006.01)
*B32B 27/36* (2006.01)
*B32B 27/40* (2006.01)
*E04F 15/02* (2006.01)

(52) U.S. Cl.
CPC ............... *B32B 5/18* (2013.01); *B32B 13/02* (2013.01); *B32B 13/12* (2013.01); *B32B 21/02* (2013.01); *B32B 27/065* (2013.01); *B32B 27/12* (2013.01); *B32B 27/304* (2013.01); *B32B 27/32* (2013.01); *B32B 27/36* (2013.01); *B32B 27/40* (2013.01); *B32B 2255/02* (2013.01); *B32B 2255/10* (2013.01); *B32B 2255/102* (2013.01); *B32B 2255/26* (2013.01); *B32B 2262/10* (2013.01); *B32B 2262/108* (2013.01); *B32B 2266/0235* (2013.01); *B32B 2266/0278* (2013.01); *B32B 2307/4023* (2013.01); *B32B 2307/412* (2013.01); *B32B 2419/04* (2013.01); *B32B 2479/00* (2013.01); *B32B 2607/00* (2013.01); *E04F 15/02038* (2013.01); *E04F 2201/023* (2013.01)

(58) Field of Classification Search
CPC ....... B32B 13/12; B32B 21/02; B32B 27/065; B32B 27/12; B32B 27/304; B32B 27/32; B32B 27/36; B32B 27/40; B32B 2479/00; B32B 2419/04; B32B 2266/0235; B32B 2266/0278; B32B 2262/10; B32B 2255/10; B32B 2255/102
See application file for complete search history.

(56) References Cited

U.S. PATENT DOCUMENTS

| | | |
|---|---|---|
| 2004/0239003 A1 | 12/2004 | Espe et al. |
| 2004/0241416 A1 | 12/2004 | Tian et al. |
| 2006/0144004 A1 | 7/2006 | Nollet et al. |
| 2008/0066406 A1 | 3/2008 | Durnberger |
| 2009/0139170 A1 | 6/2009 | Thiers |
| 2009/0260307 A1* | 10/2009 | Thiers ............ B44F 9/02 52/311.1 |
| 2015/0158330 A1 | 6/2015 | Stoffel et al. |
| 2015/0275528 A1 | 10/2015 | Muehlebach |
| 2017/0197355 A1 | 7/2017 | Stoffel et al. |
| 2018/0274246 A1 | 9/2018 | Vandevoorde |

FOREIGN PATENT DOCUMENTS

| | | |
|---|---|---|
| CN | 101137805 A | 3/2008 |
| CN | 108350694 A | 7/2018 |
| DE | 202012004375 U1 | 6/2012 |
| EP | 1482085 A1 | 12/2004 |
| EP | 2108524 A1 | 10/2009 |
| EP | 2186650 A1 | 5/2010 |
| EP | 2927015 A1 | 10/2015 |
| RU | 2402427 C2 | 10/2010 |
| RU | 2446058 C1 | 3/2012 |
| RU | 2014139290 A | 4/2016 |
| WO | 03016034 A1 | 2/2003 |
| WO | 2007072198 A2 | 6/2007 |
| WO | 2010070485 A2 | 6/2010 |
| WO | 2010079014 A2 | 7/2010 |
| WO | 2019135140 A1 | 7/2019 |

OTHER PUBLICATIONS

International Search Report and Written Opinion from PCT Application No. PCT/IB2020/056740, Oct. 26, 2020.

* cited by examiner

FLOOR PANEL

BACKGROUND

Field of the Disclosure

The invention relates to a floor panel, comprising several side edges which extend in the peripheral direction of the floor panel behind one another and are separated from one another by a corner, and a plastic top surface delimited by the side edges.

Related Art

Such a floor panel is known from EP 2 186 650. The known floor panel is provided with beveled edge portions in order to create V grooves between adjoining floor panels when producing a floor from such floor panels. The beveled edge portions are combined with visual edge effects by providing a decor under the top surface at the location of a beveled edge portion with a shadow effect in order to accentuate the beveling. The beveled edge portions are achieved by deforming the substrate, for example HDF (high density fiberboard), of the floor by means of a highly structured pressing body or pressing plate. According to EP 2 186 650, such pressing bodies are obtained by performing operations using rotating milling tools. Manufacturing pressing bodies in this way is time-consuming and risky. Obtaining such deep deformations in a DPL (direct pressure laminate) manufacturing method requires high molding pressures, for example of 60 bar or more, and a thorough know-how.

SUMMARY

It is an object of the present invention to provide a floor panel by means of which deep structural elements, such as V grooves in a floor composed of such floor panels, can easily be imitated.

This object is achieved by means of the floor panel according to the invention, wherein a portion of the top surface is provided with at least two elongate zones with a mutually different texture which also deviates from the texture of an area of the top surface which adjoins the zones, wherein the long sides of the zones adjoin each other or wherein the zones form edge zones, each of which extends along one of the side edges. In the context of the present invention, the term "texture" is understood to mean a fine structure which determines the gloss level of the respective zone or portion of the top surface. Possible rougher structural elements, such as impressions in the form of wood pores, knots, cracks or crevices do not form part of what is meant by the term "texture" here. A "texture" preferably has a Roughness value Rt over a reference length of 25 mm which is less than 30 micrometers, and/or a Roughness value Ra which is less than 12.5 micrometers. Obviously, it is not excluded that the respective zones with mutually different texture also comprise rougher structural elements. In addition, it should be noted that with a deviating texture a deviating texture pattern may be intended, wherein a portion of one zone has an identical texture to a portion of the other zone, but in which the total impression of the two zones is still different due to the different texture pattern.

It is an advantage of the invention that, due to the difference in texture in adjoining elongate zones, a deep structural element, such as a V groove, can be imitated surprisingly well, both in the case of the elongate zones which adjoin each other with their long sides and in the case where two such floor panels adjoin each other by their mutually deviating edge zones. It is clear that such an imitated V groove is preferably produced at the location of the seam between two abutting floor panels. However, it may also be present in the surface of a floor panel which, as such, represents several wood parts, wherein the imitated V groove is then situated at the location of the transition between the represented wood parts. Other examples of deep structural elements which may be imitated by means of the elongate zones with mutually different structure are cracks in a wood pattern, signs of wear, signs of saw cuts, crevices between abutting floor panels, or crevices on the surface of a floor panel which, as such, forms an imitation of several wood parts, between which the aforementioned crevice is then situated.

Creating a deviating texture in a top surface made of plastic can be achieved relatively easily, for example by impressioning with a pressure body, such as a press plate or a press plate. If a floor panel is manufactured by means of lamination, the desired texture may be obtained using relatively little pressure. As a result thereof, the risk of damage of any layers which are situated under the top surface when performing the impressioning is small. In addition, the pressing bodies to be used, for example press plates, can easily be produced by means of standard etching techniques.

Preferably, at least the actual top surface has a wood structure which possibly corresponds to a printed wood pattern situated underneath, as is known per se from EP 1 290 290. Such a wood structure may be produced, for example, by means of several impressions which generally follow the shape of a printed wood grain. The wood structure provided in the actual top surface is preferably absent in the aforementioned zones of mutually different texture.

The at least two zones may be of identical or virtually identical width, for example widths which have a ratio of between 80 and 120%.

The floor panel may have a rectangular shape, wherein the edge zones are situated along two mutually opposite side edges.

In a more specific embodiment, two of the side edges are longitudinal edges and the other two are transverse edges which are shorter than the longitudinal edges, wherein the two edge zones with different texture are situated along the mutually opposite longitudinal edges and wherein two edge zones with different texture are also situated along the mutually opposite transverse edges.

The edge zones along the transverse edges may be narrower than the edge zones along the longitudinal edges in order to imitate a natural variation in the width of V grooves in a floor.

In a particular embodiment, one of the longitudinal edges and one of the transverse edges have the same texture and the other longitudinal edge and transverse edge likewise have the same texture.

The width of each of the at least two zones may be smaller than the thickness of the floor panel.

In a particular embodiment, a transition between at least one of the zones and the area adjoining this zone of the top surface follows a non-linear line. As a result thereof, a playful variation is created in the imitated V groove.

The non-linear line may be a serrated or an undulating line.

In the case of the zones with the adjoining long sides, these may be situated at a distance from two mutually opposite side edges. The zones then run, for example, across a central portion of the floor panel. Such floor panels may be laid in such a way, that the zones in the resulting floor are in line with one another.

In a particular embodiment, at least one of the zones is lower than the area of the top surface adjoining this zone. As a result thereof, the effect of the presence of a groove is accentuated further. According to a particular option therefor, the transition from the respective zone to the adjoining area of the top surface is in the form of an abrupt transition, for example a transition in which the difference in height between the respective zone and the adjoining area of the top surface is bridged by a horizontal distance which is smaller, and preferably at least twice as small, than the respective difference in height. Such an abrupt transition reinforces the illusion that the respective zone forms a groove or V groove. The respective transition is not necessarily rectilinear, but may be configured in such a way in the longitudinal direction of the respective transition that the present distance between the transition and a side edge extending in the same direction varies along the transition.

The difference in height is for example 0.05-0.25 mm, preferably 0.1-0.15 mm.

The zone which is at least situated lower may be parallel or virtually parallel to the area of the top surface adjoining this zone. In that case, there is no genuine V-shaped groove in the laid floor, but the illusion of a V groove which is created appears to be stronger. Preferably, the respective zone is flat and/or does not deviate more than 0.1 mm from its average level.

In a practical embodiment, the plastic top surface forms part of a coating layer which is applied to a substrate.

The texture, including the abovementioned zones or edge zones, may be formed by impressions which are less deep than the coating layer.

The mutually different texture of the zones may be produced in such a way that the gloss level differs by at least one point, as determined in accordance with DIN 67530, preferably at least three points, and more preferably at least five points.

The mutually different texture of the zones may be produced in such a way that one zone has a gloss level of 10 or less and the other zone has a gloss level which is more than 10 and preferably more than 20, as determined in accordance with DIN 67530.

The gloss level of the area of the top surface adjoining the zones may be between the gloss levels of the zones.

In one particular embodiment, the texture of at least one of the zones has a varying pattern.

If desired, both zones have varying patterns which differ from one another.

The pattern or the patterns may be stripe-like.

The stripes of the stripe-like pattern at an edge zone may be at an angle to the corresponding side edge. This appears to increase the virtual V groove effect.

As mentioned above, the plastic top surface preferably forms part of a coating layer which is applied on a substrate as a top layer. Preferably, the coating layer is a decorative coating layer which, in addition to the plastic top surface, also at least comprises a printed pattern, for example in the form of a wood motif. The abovementioned printed pattern or decorative print is preferably present at both the location of the abovementioned zones with mutually different texture and at the location of the adjoining area of the top surface. In this way, the respective zones can easily have a print matching the print of the adjoining area. Obviously, it is also possible for the print at the location of the respective zones to be different from the print of the adjacent area, for example in order to achieve particular effects. Thus, for example, when imitating a V groove, a print may be provided at the short edges of an imitation wooden floor panel with end-grain wood, and/or, when imitating a crack, a dark color may be printed locally.

The floor panels of the present invention may be realized by way of various practical embodiments.

According to a first practical embodiment, the floor panels are so-called laminate panels with a substrate and a top layer with a decorative print provided thereon, wherein this top layer is substantially composed of thermoset resin and paper. This may be, for example, a laminate panel with a printed decor paper which has been soaked in a melamine-based resin, on top of which optionally a transparent paper sheet is arranged which has been soaked in a melamine-based resin. When applying the top layer, a structure and/or texture, preferably according to the invention, may be provided in the thermoset resin, for example, by compressing with a heated structured pressure body or press plate, for example when carrying out the abovementioned DPL manufacturing method. In this case, the substrate may comprise substantially an MDF or HDF board material. Alternatively, it is also possible to use a plastic substrate, such as a substrate which comprises PVC, PP (polypropylene), PET (polyethylene terephthalate), PU (polyurethane), or a mineral-based substrate, such as a substrate which comprises cement fiberboard material or magnesium oxide board material, or a substrate based on adhesively bonded mineral fibers, such as a rock wool fiber board.

According to a second practical embodiment, the floor panels comprise a substrate and a top layer which is provided thereon which comprises a print which is formed on the substrate. Thus, for example, the substrate may be provided with one or several bottom layers or primers, optionally applied in liquid form, before producing the print. During printing, an ink pattern may be applied to the abovementioned bottom layers or primers, for example by means of rollers and/or by means of a digital printer, such as by means of an inkjet printer. On top of the print, a transparent or translucent plastic layer may be arranged. Such a plastic layer may be cured by means of UV radiation, for example in the case of a UV-curable acrylate-based plastic layer. According to another possibility, such a plastic layer is a polyurethane-based layer, for example a hotmelt layer. During curing, or immediately prior thereto or some time thereafter, for example in the case of a reactivated plastic, such as a hotmelt layer, the plastic layer may be provided with a structure and/or texture, preferably according to the invention, by means of a pressure body, for example by means of a roller or a structured press film. In this case, the substrate may substantially comprise an MDF or HDF board material. Alternatively, it is also possible to use a plastic substrate, such as a substrate which comprises PVC, PP (polypropylene), PET (polyethylene terephthalate), PU (polyurethane), or a mineral-based substrate, such as a substrate which comprises cement fiberboard material or magnesium oxide board material, or a substrate on the basis of adhesively bonded mineral fibers, such as a rockwool fiber board.

According to a third practical embodiment, the floor panels are so-called LVT, SPC or WPC panels, with a substrate and top layer with a decorative print provided thereon, wherein this top layer is substantially composed of a thermoplastic, such as PVC, PP (polypropylene), PET (polyethylene terephthalate), PU (polyurethane). This may be, for example, a panel with a printed PVC film, onto which a transparent PVC film has optionally been laminated.

During, before or after the thermoplastic, for example the transparent film, has been applied, it may be provided with a structure and/or texture, preferably according to the invention, for example by means of a structured pressure body. Preferably, the respective plastic is heated prior to being provided with a structure, and the pressure body is unheated or cooled. In this case, the substrate may be a board material comprising PVC. Alternatively, it is also possible to use MDF or HDF board material or a substrate which comprises PP (polypropylene), PET (polyethylene terephthalate), PU (polyurethane), or a mineral-based substrate, such as a substrate which comprises cement fiberboard material or magnesium oxide board material, or a substrate on the basis of adhesively bonded mineral fibers, such as a rockwool fiber board.

According to a variant, the invention relates to floor coverings, for example of the type which is rollable or broadloom, instead of floor panels. This may be, for example, strips of so-called "cushion vinyl" or another rollable floor covering, for example on the basis of polyurethane. Such floor covering usually comprises a substrate which may or may not be foamed, a decorative print and a plastic wear layer provided on top thereof, for example made of PVC (polyvinylchloride), as is the case with "cushion vinyl", or PU (polyurethane). It is obvious that zones with a mutually different texture, as described above with reference to panels, can also be used here, in particular when such floor covering represents several floor panels. In such a case, the zones may be used to imitate a groove, V groove or crevice between two illustrated panels.

According to another variant, the invention may also be used with other panels or coverings than floor panels. The invention may, for example, also be used with wall panels, furniture panels or ceiling panels.

It will be clear that the texture of the invention can be achieved in any desired way and therefore does not necessarily have to be achieved by means of deforming or impressing the top surface. It is namely also possible that the substrate is deformed or impressed, and that the texture and/or structure of the substrate is transferred onto a top layer which is arranged on top thereof. Furthermore, it is also possible for the structure and/or texture to be achieved in a different way than by means of a mechanical deformation or impression. Thus, it is possible, for example, to achieve the structure and/or texture in a chemical way, for example by means of digital techniques for achieving texture, for example the techniques which are described per se in WO 2019/135140, WO 2010/070485 or EP 2 108 524.

It should furthermore be noted that although the texture of the invention in itself can give a realistic impression of depth, it may obviously be combined with an actual structure, for example an impression. It is therefore not ruled out that the appearance of an actual structural element, such as a V groove, is reinforced further by means of the texture of the invention and/or its preferred embodiments. Texture, structure, gloss, angle of inclination, depth and incidence of light may contribute to the appearance of any decorative aspect of the panel.

It will be clear that, although mainly examples of wood imitations are given above, the present invention may also be used to imitate stone or for fantasy motifs. In the case of stone, it is possible, for example, to imitate a cement joint by means of the abovementioned zones of mutually different texture and/or differences in height can be imitated between different layers of layered types of stone, as may be the case with slate.

BRIEF DESCRIPTION OF THE DRAWINGS

The invention will be described in more detail below by means of drawings, which illustrate exemplary embodiments of the invention in highly diagrammatic form.

DETAILED DESCRIPTION OF VARIOUS EMBODIMENTS

Figure 1:
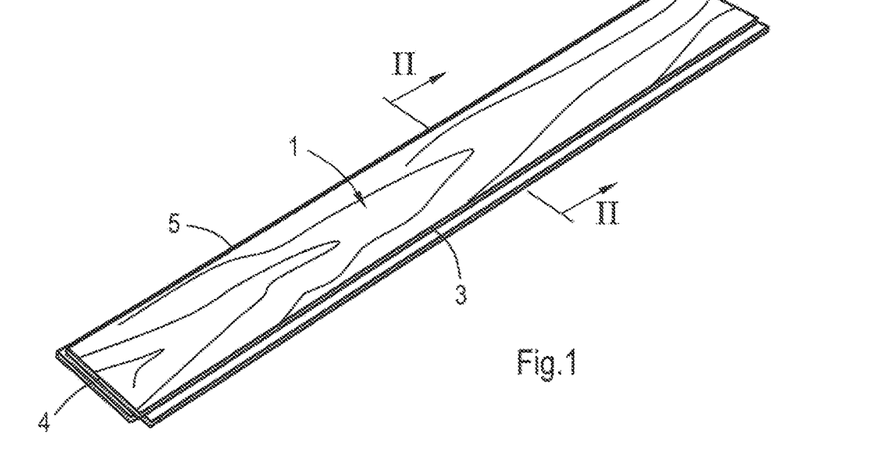
FIG. 1 shows a perspective view of an exemplary embodiment of a floor panel according to the invention.

FIG. 1 shows an exemplary embodiment of a floor panel 1 according to the invention. The exemplary embodiment shown in FIG. 1 has a rectangular shape with four side edges 2-5, namely two mutually opposite transverse edges 2, 4 and two mutually opposite longitudinal edges 3, 5. The side edges 2-5 extend in the peripheral direction of the floor panel 1 behind one another and are separated from one another by a right angle. The longitudinal edges 3, 5 are longer than the transverse edges 2, 4. On both pairs of mutually opposite side edges, the floor panel 1 is provided with coupling parts by means of which several such floor panels 1 can be coupled to each other in order to form a floating floor covering. It is also conceivable for a floor panel to be free from coupling parts and to be attached directly to a floor, for example by means of glue, or loose. Also, a floor panel having a different shape than a rectangle is also conceivable.

Figure 2:
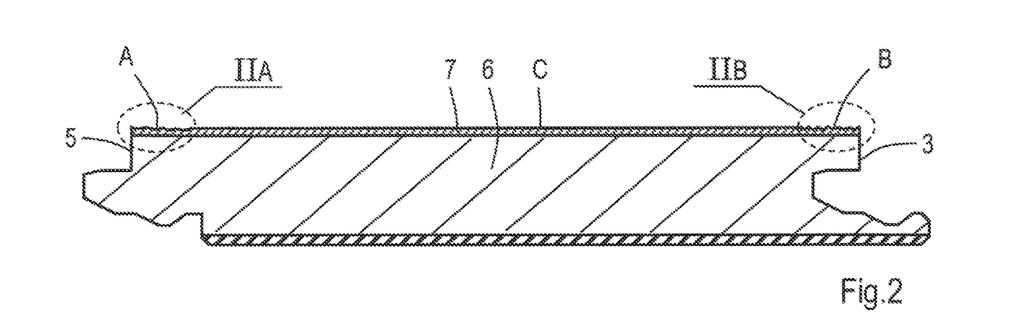
FIG. 2 shows a sectional view of the floor panel from FIG. 1 along the line II-II in FIG. 1.
Figure 2A:
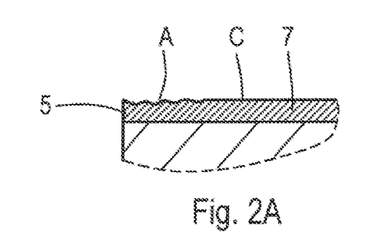
FIGS. 2A and 2B are enlarged views of FIG. 2 where they are denoted by IIA and IIB, respectively.
Figure 2B:
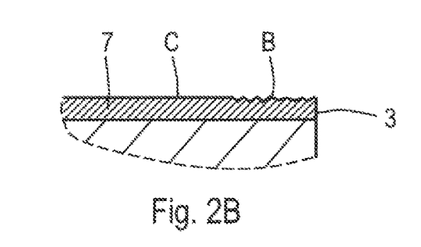
Figure 3:
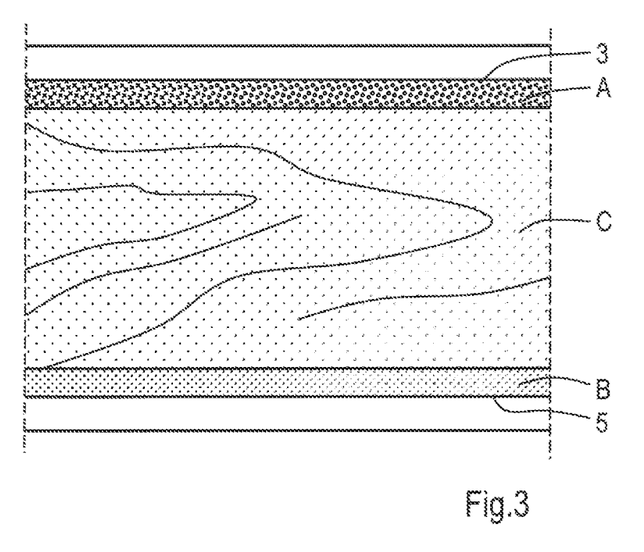
FIG. 3 is a top view of a portion of the floor panel from FIG. 1 on an enlarged scale.
Figure 4:
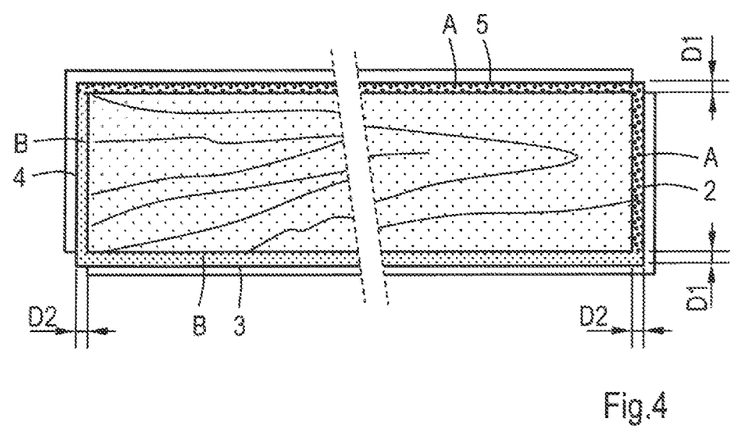
FIG. 4 is a top view of the floor panel from FIG. 1.

FIGS. 2-4 show more detailed views of the floor panel 1 from FIG. 1. The floor panel 1 is configured as a laminate, of which only a substrate 6 with a plastic top layer 7 and a plastic bottom layer is shown in FIG. 2 for the sake of clarity. In the fitted state of the floor covering, the top layer 7 forms the visible side of the floor panel 1. In reality, one or several intermediate layers may be present between the substrate 6 and the top layer 7, for example a decorative layer. In FIG. 2-4, the top layer is shown as being relatively thick for the sake of the explanation, but in reality the thickness may be, for example, only 0.2 millimeter, whereas the total thickness of the floor panel 1 is, for example, between 6 millimeters and 15 millimeters. The plastic of the top layer 7 may contain a thermosetting resin. It should be noted that the top layer 7 is not necessarily a laminated layer. The substrate may be made, for example, from MDF or HDF.

Due to the presence of the abovementioned top layer 7, the floor panel 1 has a plastic top surface which is delimited by the side edges 2-5. The top surface is provided with a non-uniform texture. FIG. 4 shows that the top surface is provided with four elongate edge zones or strips which are delimited by the respective side edges 2-5 and extend along the respective side edges 2-5. The respective edge zones along the two mutually opposite longitudinal edges 3, 5 have a different texture, denoted by A and B, see FIG. 3. The respective edge zones along the two mutually opposite transverse edges 2, 4 also have a different texture, in this case likewise denoted by A and B, see FIG. 4. In the exemplary embodiment shown here, the edge zones along the longitudinal edges 3, 5 are of equal width, as is indicated by D1, and the edge zones along the transverse edges 2, 4 are of equal width, as is indicated by D2. However, the width of the edge zones along the longitudinal edges 3, 5 is greater than the width of the edge zones along the transverse edges 2, 4. Although the edge zones in FIGS. 2-4 have been shown as being of equal width, they are relatively narrow in reality, for example narrower than the thickness of the floor panel 1. The widths are, for example, in the order of magnitude of 0.5 centimeter. Also, the textures A, B illustrated in FIG. 2 have been drawn as exaggerated rough surfaces, but in reality the roughness of the surfaces is on a microscopic scale. The top surface of the top layer 7 has a different texture between the edge zones than within the edge zones, which is denoted as C. The expression 'different texture' may also be understood to mean that there is no texture. In addition to the texture C, the structure on the actual top surface may also comprises rougher structural features, such as patterns of impressions which imitate, for example, wood grains, as illustrated in FIGS. 1, 3 and 4, but numerous other patterns are conceivable.

Figure 2C:
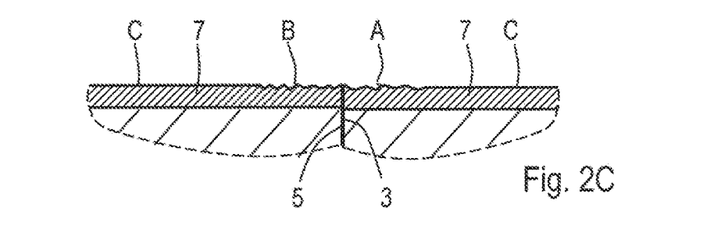
FIG. 2C is the same view as FIGS. 2A and 2B, which illustrate a situation of two coupled floor panels.

FIG. 2C illustrates that if two identical floor panels 1 are coupled to one another in such a way that the respective longitudinal edges 3, 5 come into contact with each other, the respective edge zones with different texture A, B adjoin each other. This was found to create a surprising visual effect, because the impression is given that a V groove is present in the transition area between the adjoining floor panels 1. In order to achieve this effect, the average level of the top surface at the location of the edge zones does not necessarily have to be lower than the average level of the top surface in the area between the edge zones.

Figure 5:
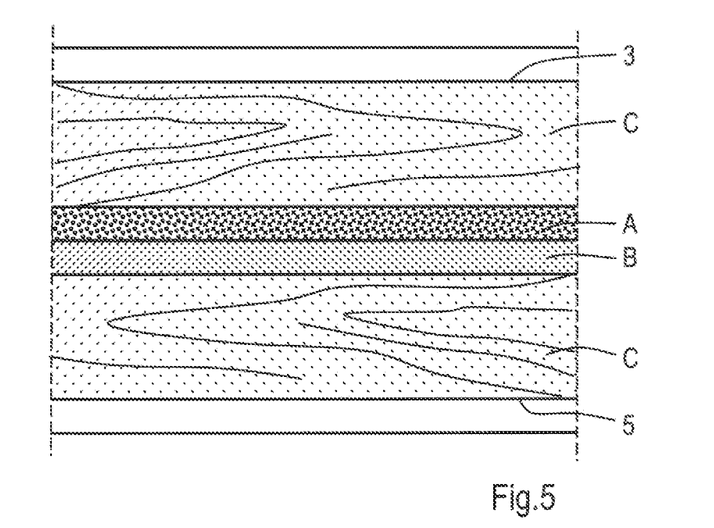
FIG. 5 is the same view as in FIG. 3, but shows an alternative exemplary embodiment.
Figure 6:
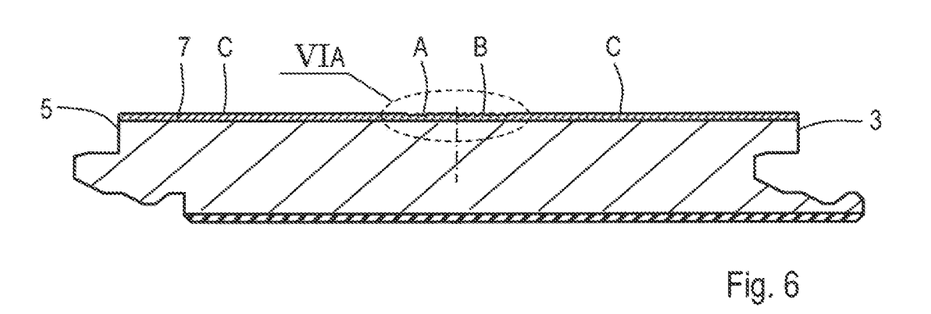
FIG. 6 is a cross-sectional view of the exemplary embodiment from FIG. 5.
Figure 6A:
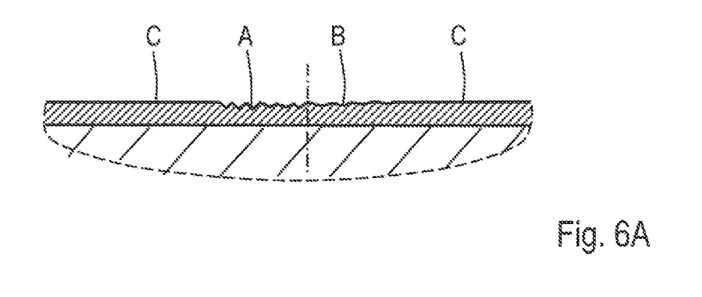
FIG. 6A is an enlarged view of FIG. 6 where it is denoted as VIA.

FIGS. 5, 6 and 6A show an alternative exemplary embodiment. In this case, the strips or elongate zones with a mutually different texture A, B are situated at a distance from the longitudinal edges 3, 5 and extend parallel to the longitudinal edges 3, 5. Respective long sides of these zones adjoin each other. On both sides of the adjoining zones, the top surface of the top layer 7 is provided with a different texture, which is again denoted here by C. If desired, the texture on both sides of the adjoining zones may be different, as long as there is a difference between each zone and the adjoining area of the top surface.

Figure 7:
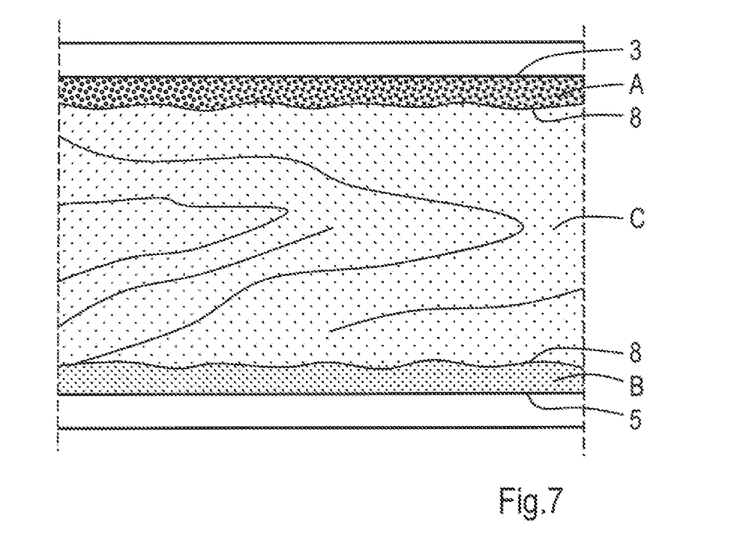
FIG. 7 is the same view as in FIG. 3 of another alternative exemplary embodiment.
Figure 8:
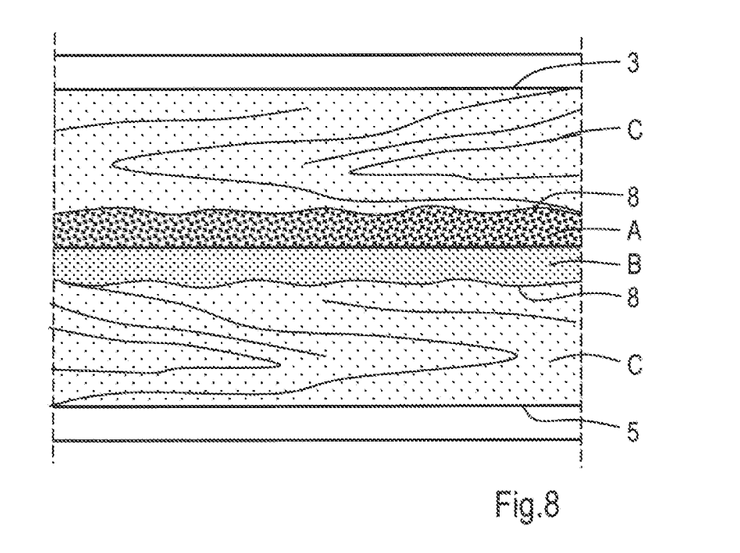
FIG. 8 is the same view as in FIG. 5 of another alternative exemplary embodiment.

FIGS. 7 and 8 show further exemplary embodiments, which are variants of those from FIG. 3 and FIG. 5, respectively. In these cases, the transition between a zone with deviating texture A, B and an area of the top surface adjoining this zone follows a non-linear, in this case a wavy, line 8.

Figure 9:
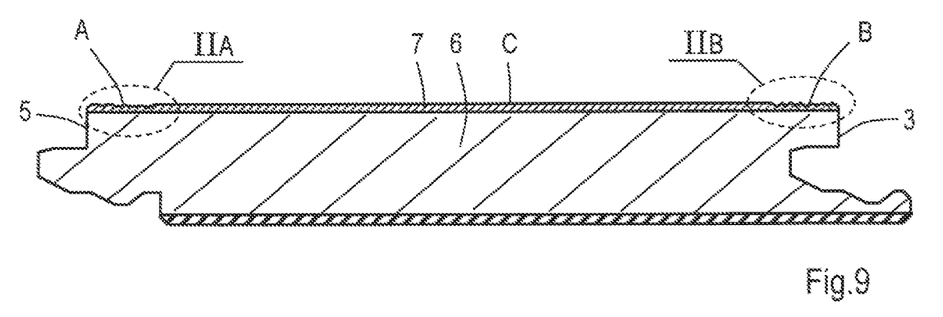
FIG. 9 is the same view as in FIG. 2 of another alternative exemplary embodiment.

FIG. 9 shows yet another alternative exemplary embodiment, wherein the edge zones are situated lower than the top surface in the area between the edge zones. The depression is relatively small; the difference in height may be, for example, in the range of 0.1-0.15 mm. In this case, the top surface in the edge zones is parallel to the top surface in the area between the edge zones. Such depressions may also be used with elongate zones in embodiments as illustrated in FIGS. 5 and 8.

Figure 10:
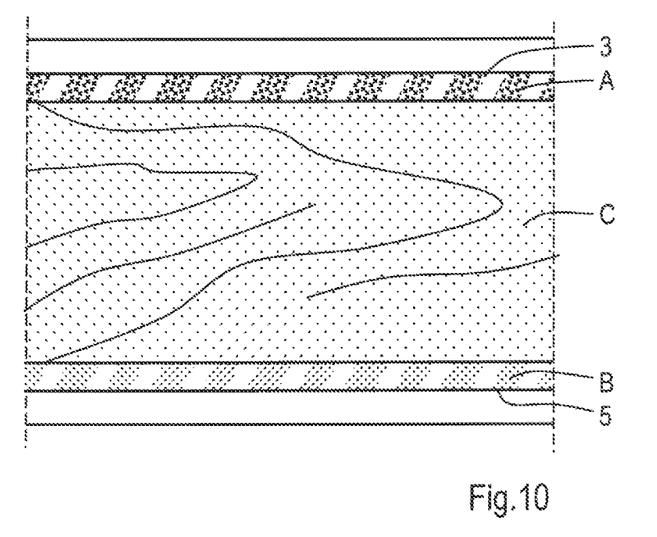
FIG. 10 is the same view as in FIG. 3 of another alternative exemplary embodiment.

FIG. 10 shows a further exemplary embodiment, in which the texture of the edge zones have varying patterns. In this case, the patterns are stripe-like, the stripes being at an oblique angle to the longitudinal edges 3, 5. Numerous alternative patterns are conceivable. Such pattern may also be used with elongate zones in embodiments as shown in FIGS. 5 and 8.

Figure 11:
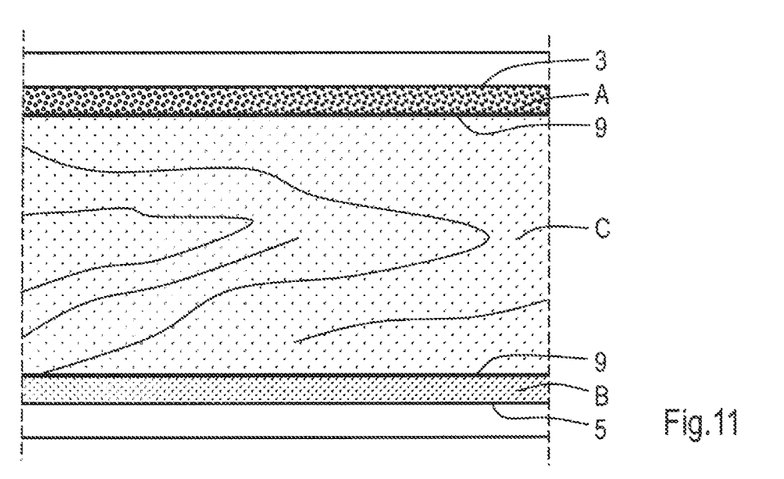
FIG. 11 is the same view as in FIG. 3 of another alternative exemplary embodiment.

FIG. 11 shows a further exemplary embodiment which is very similar to the exemplary embodiment as illustrated in FIG. 3, but with the transitions between the textures A, B of the edge zones, on the one hand, and the texture C in the area which adjoins the edge zones, on the other hand, being accentuated by means of transition lines 9. In FIG. 11, these transition lines 9 are shown relatively thick, but in reality these may be relatively thin. Such a transition line 9 may be created by allowing the texture to deviate locally with respect to the textures on both sides of the transition line 9. It is also possible to provide a recess or protrusion in the top surface at the location of the transition line 9.

Figure 12:
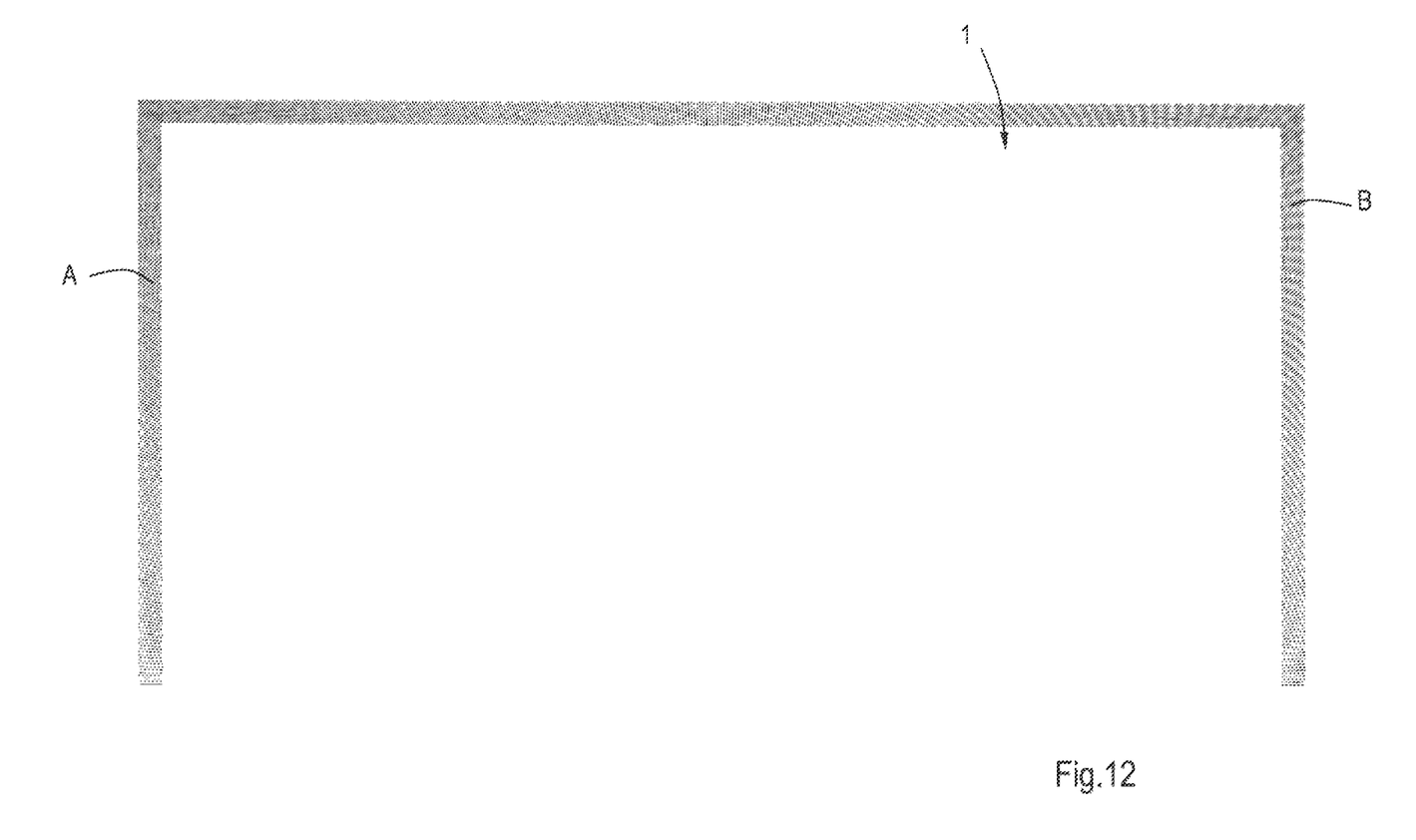
FIG. 12-16 show top views of respective portions of various alternative exemplary embodiments of a floor panel according to the invention.
Figure 13:
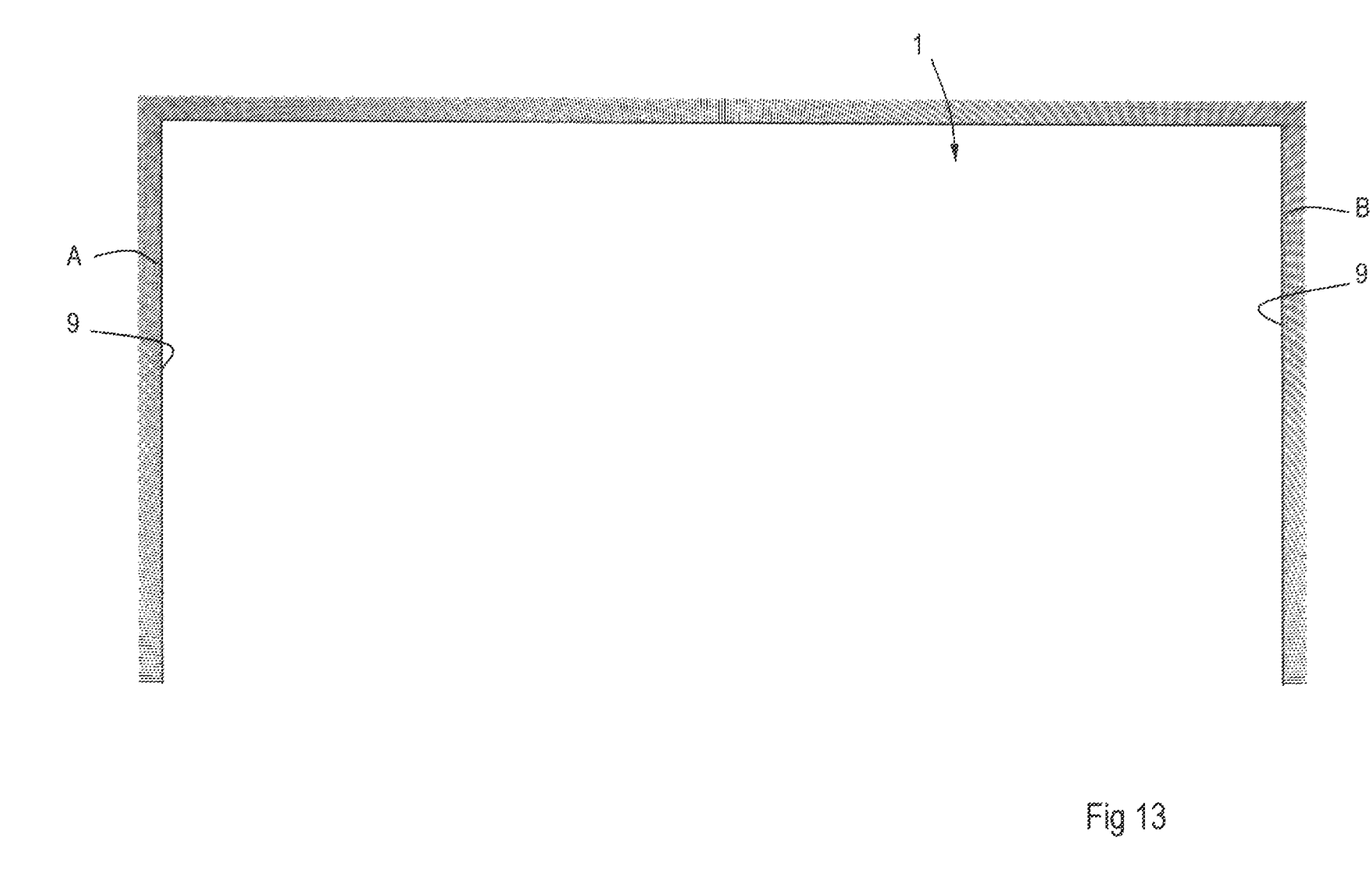
Figure 14:
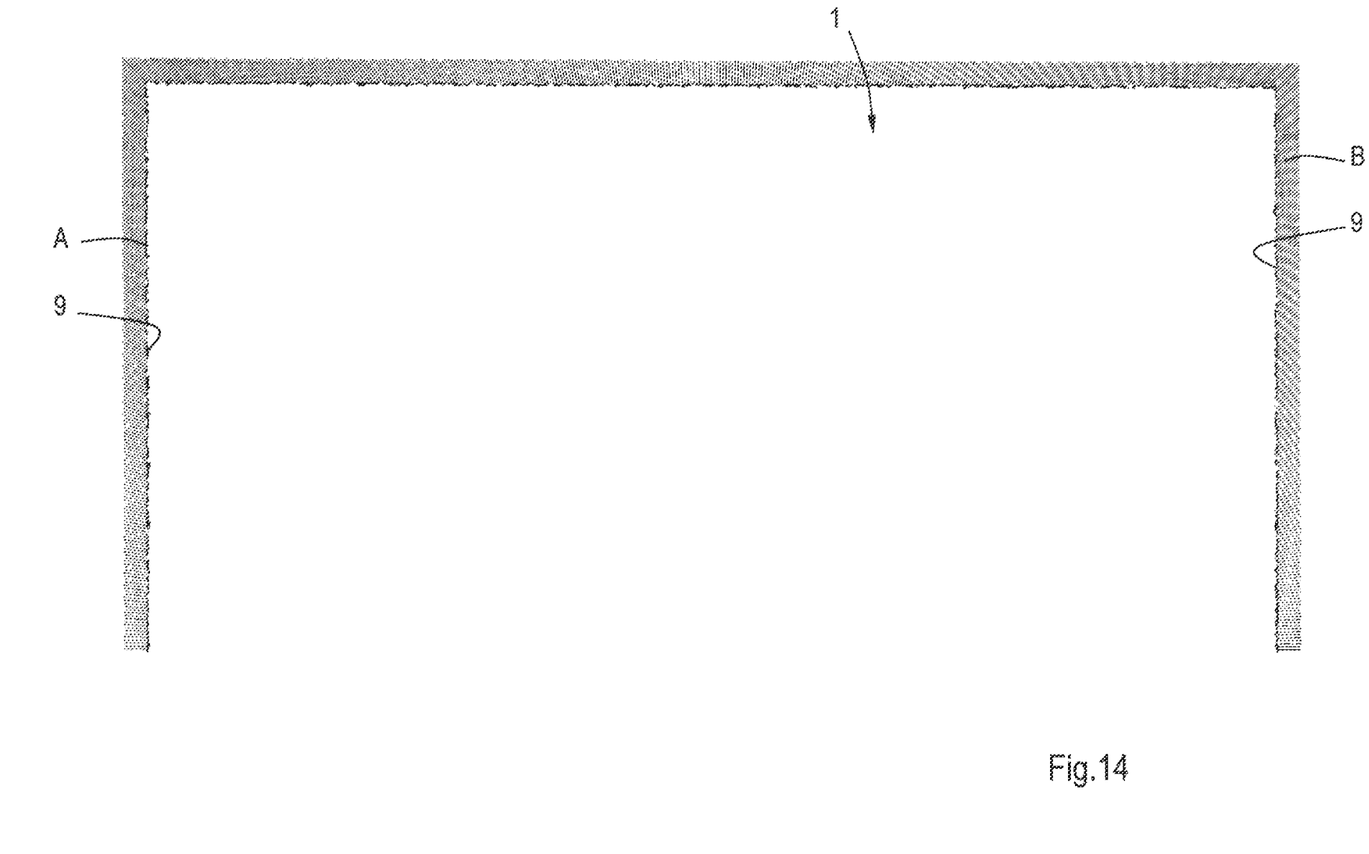

FIGS. 12-16 show further exemplary embodiments with variations in the edge zones. FIG. 12 shows an exemplary embodiment wherein the texture of the edge zones comprises stripe-like patterns. The orientation of the stripes along the side edges changes in longitudinal direction of the edge zones. FIG. 12 shows that the edge zones on the left-hand side and the right-hand side of the panel 1 differ from each other. FIG. 13 shows a variant in which straight transition lines 9 are provided between the textures A, B of the edge zones and a portion of the top surface which extends between the edge zones. FIG. 14 shows a further variant in which the transition lines 9 have an irregular shape.

Figure 15:
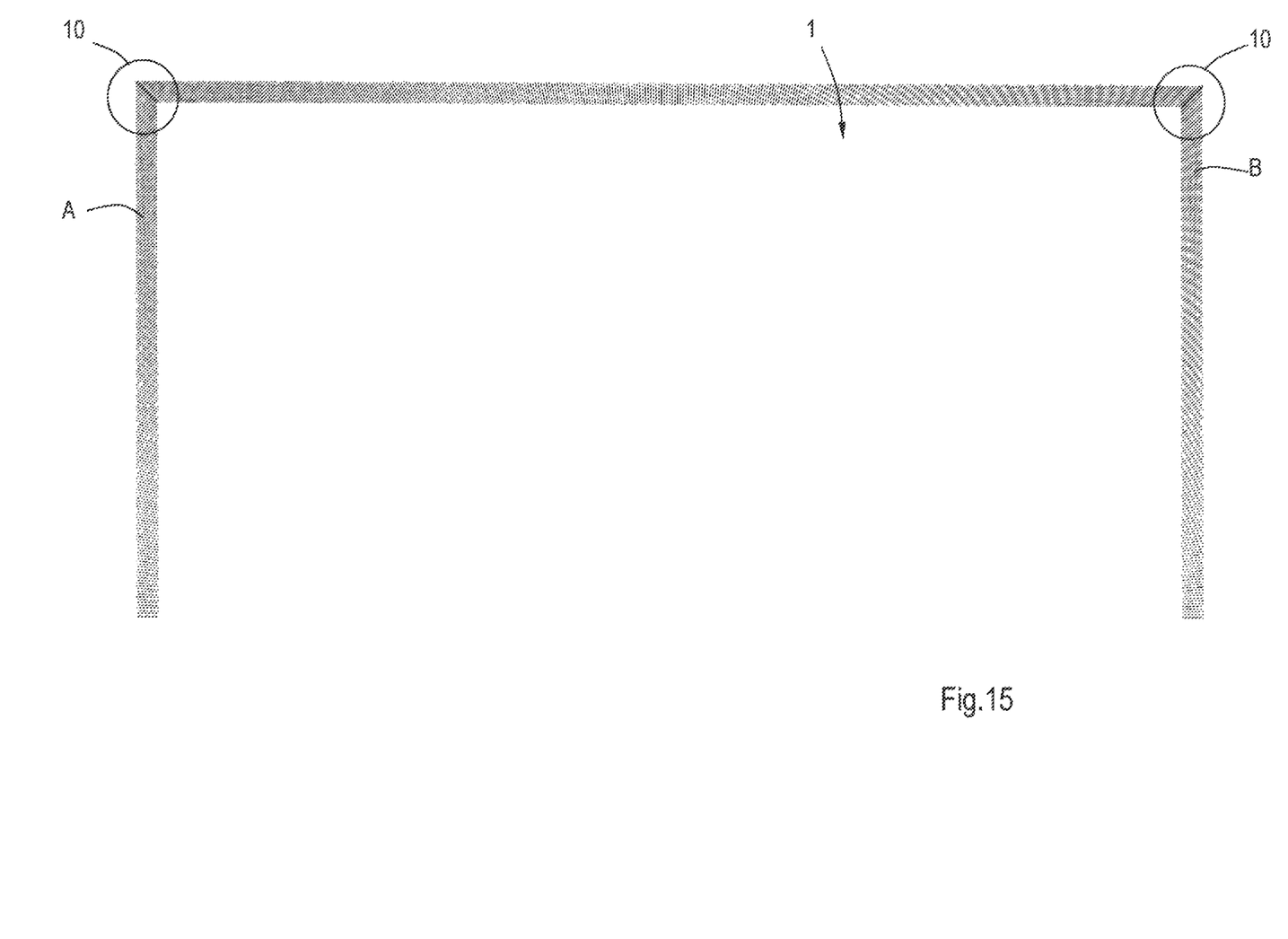

FIG. 15 shows an exemplary embodiment in which transitions between the edge zones at the location of corners 10 between respective side edges are accentuated, in this case by bold lines which are at an angle of 45° to the adjoining side edges at the location of the respective corner 10. This accentuation may also be provided with the exemplary embodiments, as illustrated in FIGS. 13 and 14.

Figure 16:
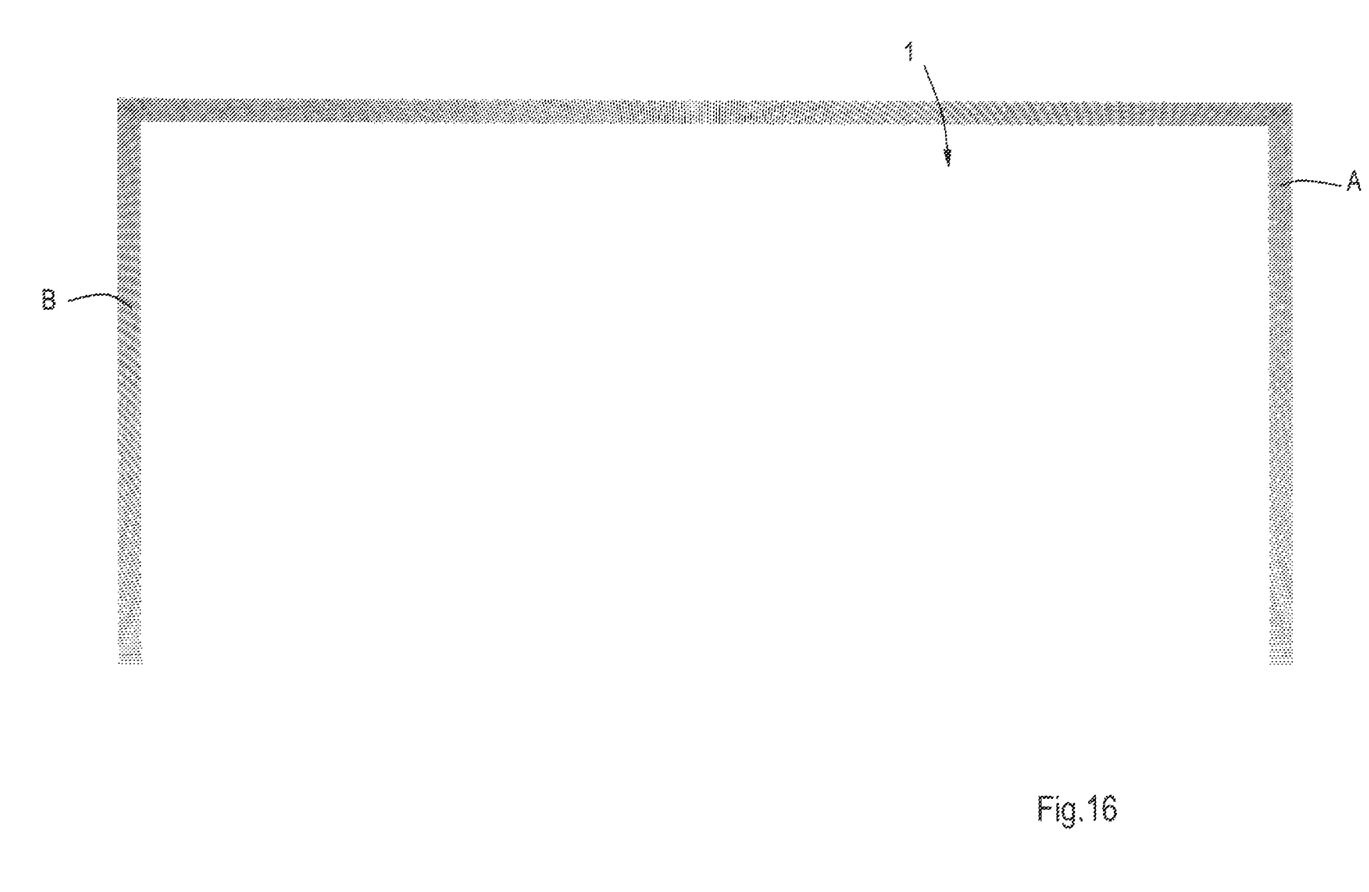

FIG. 16 shows an exemplary embodiment in which the textures A, B of the edge zones are reversed compared to those in FIG. 12. This exemplary embodiment may likewise be combined with the accentuation of the corners 10, as illustrated in FIG. 15, and/or with the straight transition lines 9 from FIG. 13 and/or with the irregular transition lines 9 from FIG. 14.

The textures A, B may be formed by impressions which are less deep than the top layer 7. Each of the textures A, B may be provided in such a way that a certain gloss level is achieved. The mutually different textures A, B of the zones may be produced in such a way that the gloss level differs by at least one point, as determined in accordance with DIN 67530, preferably at least three points and more preferably at least five points. One zone may have a gloss level of 10 or less and the other zone may have a gloss level of more than 10 and is preferably more than 20, as determined in accordance with DIN 67530. The gloss level of the area of the top surface adjoining the zones with texture C, may be between the gloss levels of the zones.

The texture C in the area which adjoins one of the zones with deviating texture A or B may have a varying pattern, for example a gradually changing pattern, which becomes more glossy or less glossy as one gets closer to the zone with deviating texture A or B.

The texture may be created in a known manner by providing a pressing sheet metal or press plate with a desired texture via, for example, etching techniques or spark milling before pressing down the top layer.

The invention is not limited to the exemplary embodiments illustrated in the drawings and described above which may be varied in different ways without departing from the scope of the invention. It is for example conceivable to combine the features of the various exemplary embodiments with one another.

The invention claimed is:

1. A floor panel, comprising several side edges which extend in a peripheral direction of the floor panel behind one another and are separated from one another by a corner, and a plastic top surface delimited by the side edges,
   wherein a portion of the top surface is provided with at least two elongate zones with a mutually different texture which also deviates from the texture of an area of the top surface which adjoins to the at least two zones,
   wherein long sides of the at least two elongate zones adjoin each other or wherein the at least two elongate zones form edge zones, each of which extends along one of the side edges;
   wherein the mutually different texture of the at least two elongate zones is produced in such a way that a gloss level differs by at least one point, as determined in accordance with DIN 67530.

2. The floor panel in accordance with claim 1, wherein the at least two elongate zones are of equal width.

3. The floor panel in accordance with claim 1, wherein the floor panel has a rectangular shape, and the at least two elongate zones are situated along two mutually opposite side edges.

4. The floor panel in accordance with claim 3, wherein two of the side edges are longitudinal edges and the other two are transverse edges which are shorter than the longitudinal edges,
   wherein the at least two elongate zones with different texture are situated along mutually opposite longitudinal edges and
   wherein two edge zones with different texture are also situated along mutually opposite transverse edges.

5. The floor panel in accordance with claim 4, wherein the edge zones along the transverse edges are narrower than the edge zones along the longitudinal edges.

6. The floor panel in accordance with claim 4, wherein one of the longitudinal edges and one of the transverse edges have the same texture and the other longitudinal edge and transverse edge likewise have the same texture.

7. The floor panel in accordance with claim 1, wherein a width of each of the at least two elongate zones is smaller than a thickness of the floor panel.

8. The floor panel in accordance with claim 1, wherein a transition between at least one of the zones and the area adjoining this zone of the top surface follows a non-linear line.

9. The floor panel in accordance with claim 8, wherein the non-linear line is a serrated or an undulating line.

10. The floor panel in accordance with claim 1, wherein the zones with the adjoining long sides are situated at a distance from two mutually opposite side edges.

11. The floor panel in accordance with claim 1, wherein at least one of the zones is lower than the area of the top surface adjoining this zone.

12. The floor panel in accordance with claim 11, wherein the zone which is at least situated lower is parallel to the area of the top surface adjoining this zone.

13. The floor panel in accordance with claim 1, wherein the plastic top surface forms part of a coating layer which is applied to a substrate.

14. The floor panel in accordance with claim 13, wherein the texture is formed by impressions which are less deep than the coating layer.

15. The floor panel in accordance with claim 1, wherein the mutually different texture of the zones is produced in such a way that one zone has a gloss level of 10 or less and the other zone has a gloss level which is more than 10, as determined in accordance with DIN 67530.

16. The floor panel in accordance with claim 1, wherein the gloss level of the area of the top surface adjoining the zones is between the gloss levels of the zones.

17. The floor panel in accordance with claim 1, wherein the texture of at least one of the zones has a varying pattern.

18. The floor panel in accordance with claim 17, wherein both zones have varying patterns which differ from one another.

19. The floor panel in accordance with claim 17, wherein the pattern is in a form of a stripe or plurality of stripes.

20. The floor panel in accordance with claim 19, wherein the stripe or plurality of stripes of the pattern at an edge zone are arranged at an angle to the corresponding side edge.

* * * * *